(12) United States Patent
Neuneier et al.

(10) Patent No.: US 7,904,443 B2
(45) Date of Patent: Mar. 8, 2011

(54) COMPUTER-BASED METHOD OF MEASURING THE USABILITY OF A WEB SITE

(75) Inventors: Ralph Neuneier, Princeton, NJ (US); Michal Skubacz, Gröbenzell (DE); Carsten Dirk Stolz, Müchen (DE); Maximilian Viermetz, Müchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 54 days.

(21) Appl. No.: 11/990,796

(22) PCT Filed: Aug. 3, 2006

(86) PCT No.: PCT/EP2006/065050
§ 371 (c)(1),
(2), (4) Date: Feb. 17, 2009

(87) PCT Pub. No.: WO2007/023076
PCT Pub. Date: Mar. 1, 2007

(65) Prior Publication Data
US 2009/0204573 A1   Aug. 13, 2009

(30) Foreign Application Priority Data
Aug. 25, 2005   (EP) .................................... 05018526

(51) Int. Cl.
*G06F 17/30* (2006.01)
*G06F 7/00* (2006.01)
(52) U.S. Cl. ........................................................ 707/709
(58) Field of Classification Search .................. 707/709
See application file for complete search history.

(56) References Cited

FOREIGN PATENT DOCUMENTS
EP   0 687 988 A2   12/1995
WO   WO 02/08903 A2   1/2002

OTHER PUBLICATIONS

Shakery et al.: Relevance Propagation for Topic Distillation UIUC TREC-2003 Web Track Experiments, 12th TREC, 2003.*
Ding et al.: A Generalized Site Ranking Model for Web IR, Ryerson University, Canada, Oct. 13-17, 2003.*
At Web Track and Terabyte Track of TREC 2004, Beijing, 2004.*
Stolz,C., Gedov,V., Yu,K., Neuneier,R.and Skubacz,M; "Measuring Semantic Relations of Web Sites by Clustering of Local Context", ICWE2004, Müchen (2004), In Proc. International Conference on Web Engineering 2004, Springer, p. 182-186.
Stolz C., Viermetz M., Skubacz M. and Neuneier R., "Improving semantic consistency of web sites by quantifying user intent", Springer LNCS: Proc. of 5th Int. Conference on Web Engineering, ICWE 2005, Sydney, Australia, 2005, p. 1-10.
Ivory, Melody Y. and Hearst, Marti A., "The State of the Art in Automating Usability Evaluation of User Interfaces", ACM Computing Surveys ACM USA, vol. 33, No. 4, Dec. 2001, pp. 470-516.
Gedov V. et al., "Matching Web Site Structure and Content", Thirteenth Int. World Wide Web Conf. Proc. WWW2004, 2004, pp. 286-287.

* cited by examiner

*Primary Examiner* — Kuen S Lu
(74) *Attorney, Agent, or Firm* — Buchanan Ingersoll & Rooney PC

(57) ABSTRACT

Computer-based method of detecting the guidance performance of an information driven web site for a user seeking a desired content, wherein a transition value is assigned to each click based on the effectiveness and efficiency of transition between web pages of such web site, and an indicator value is determined by combining these values into a metric, which reflects guidance performance of such web site.

11 Claims, 3 Drawing Sheets

COMPUTER-BASED METHOD OF MEASURING THE USABILITY OF A WEB SITE

CROSS REFERENCE TO RELATED APPLICATIONS

This application is the US National Stage of International Application No. PCT/EP2006/065050, filed Aug. 3, 2006 and claims the benefit thereof. The International Application claims the benefits of European application No. 05018526.3 filed Aug. 25, 2005, both of the applications are incorporated by reference herein in their entirety.

FIELD OF INVENTION

The present invention relates to a computer-based method of detecting the guidance performance of an information driven web site for a user seeking a desired content.

BACKGROUND OF THE INVENTION

For the evaluation of web sites a multitude of metrics are available. Apart from general statistical measures, success metrics reflect the degree to which a web site achieves its defined objectives. Particularly metrics for e-commerce sites based on transaction analysis are commonly available and well understood. In contrast to transaction-based sites, the success of web sites geared toward information delivery is harder to quantify since there is no direct feedback of user intent. User feedback is only directly available on transactional web sites.

The fast development has established the Internet as a new medium for private and business communications and transactions. Private as well as corporate entities use this medium as a platform for presentation, communication, sales transaction, entertainment, service and information. Almost every company maintains a web presence and invests considerable amounts of time and money into increasing the attractiveness of their web site. The profitability of this investment is most easily measurable by the monetary value of the transactions handled by the web site. Many metrics have been developed for such web sites. But these metrics are not directly applicable for web sites without sales or purchase activity. This suggests a development of new metrics making the success of an information driven web site measurable.

The challenge in developing a new metrics rises from the main difference between transactional and information driven web sites, ie the user feedback. By purchasing a product on a web site, the user gives feedback about the web site and the whole purchasing process. He does not stay anonymous and provides personal billing data, making him identifiable when returning to the web site. In contrast to that, a user on an information driven web site stays anonymous and it remains uncertain whether he was interested in the content he visited.

In the following, an overview of existing metrics and measurements for web site success is provided. Before web measures can be developed, the objectives of a web site have to be specified. Regarding corporate web sites, the business models range from sell or purchase, inform, entertain or communicate via the Internet. The objectives of a web site can be derived from its business model, ie increase sales or improve usability or attractiveness. Consecutively, measures have to be defined to quantify or qualify the achievement of the respective objectives.

The applicant of the on hand specification analyzed web content to identify topics on web sites (C. Stolz, V. Gedov, K. Yu, R. Neuneier, and M. Skubacz. Measuring semantic relations of web sites by clustering of local context. In Springer LNCS: Proc. of 4th International Conference on Web Engineering, ICWE 2004, Munich, Germany, pages 182-186. Springer, 2004). This is a prerequisite to understand what a user is interested in, not yet a metric by itself.

Regarding web user and usage measurement, the measurements for content and structure by themselves cannot confidently measure the success of a web site, ie the users determine the success of a web site.

The user intention and by extension the web site's success can be easily measured if the user completes a transaction on an e-commerce site. On transaction based web sites a variety of success measures have been developed. In transaction based success measures, the users declare their intentions as soon as they are willing to pay for a product and purchase it, revealing also the monetary value or utility. If a purchase is conducted on a web site, this makes the success measurement straightforward and allows deeper analysis of the whole purchase process.

However, in information provision based success measurements, the absence of transactions makes it challenging to discover the user's intention and satisfaction. Most approaches combine structural, content and usage data to uncover the user's intention.

The applicant of the on hand specification already compared the user's intention and web site perception with the intentions of the web author identifying inconsistencies between both user and web author. This metric regards the whole web site and all users as a whole, resulting in an indicator for improvements in web site design. Such approach allows a qualitative but not success oriented judgment about a web site.

Summarizing the existing success based metrics for information driven web sites, the utility of a new quantification of the web site's success is considerable.

SUMMARY OF INVENTION

It is therefore an object of the present invention to measure the success of an information driven web site in meeting its objective to deliver the desired information in a timely and usable fashion.

Such object is solved by a method, wherein a transition value is assigned to each click based on the effectiveness and efficiency of transition between web pages of such web site, and an indicator value is determined by combining these values into a metric, which reflects guidance performance of such web site.

Motivated to discover user perception of a web site, an approach has already been presented by the applicant of this specification that combines user behavior, site content and structure while also harnessing user feedback. Developing a measurement for information driven web presences, the objective of the web site must first be determined. Afterwards available information may be identified that can contribute to a good estimation of a successful user session.

The objective of a non-e-commerce web site is not the facilitation of client transactions but rather providing information to users. This objective is reached when a user has found the piece of information he or she was looking for. Hence, it has to be explored whether a user has found the sought after piece of information. Then, estimation is carried out if the user was interested in the piece of information offered by the web site.

Effectiveness of an information driven web site depends on successfully leading the user to pages providing the sought after content. In this approach, it is distinguished between pages helping the user to find information and navigating the web site, particularly navigation pages, as opposed to content pages, considered to be sources of information.

Having a measure for the effectiveness, measures for efficiency will focus on evaluating the time it took the user to complete his or her task. A web site is efficient if the user is guided to the content quickly, demanding a short duration on navigation pages.

Instant method introduces a metric to measure the success of an information driven web site in meeting its objective to deliver the desired information in a timely and usable fashion. Since the only information available is the path the user takes through the web site, each step is evaluated for its contribution towards meeting the objective of the web site. It is therefore proposed to assign a transition value to each click based on transition effectiveness and efficiency. These values are then combined into a scoring model describing the success of a web site in meeting its objectives. The resulting metric is introduced as the GPI (Guidance Performance Indicator).

In one aspect of present invention effectiveness of transition is measured based on web page categories, such categories including navigation and content pages, and transitions between such categories are evaluated for qualifying successful guidance of the user. Information can be found on pages filled with content. Other pages are used to structure the web site and allow easy and intuitive navigation. In this approach, it is distinguished between navigation and content pages and the transitions between both categories are evaluated, thereby creating a matrix of every possible category transition.

Since the intended target page is reachable via navigation pages, the transition from navigation pages to content pages can generally be regarded as successful for a web sites objective. An overview of web page category transitions is depicted in table 1, rows showing the source page of a click sequence and columns the target page.

TABLE 1

1. Page Category Transition Rating

| | | Destination (second click) | | | |
|---|---|---|---|---|---|
| | | Home | Sitemap | Search | Content | Session End |
| Start (first click) | Home | – | – | – | + | – |
| | Sitemap | – | – | – | + | – |
| | Search | – | – | – | + | – |
| | Content | – | – | – | + | 0 |

The pages dedicated to guiding the user through the web site are Home and Search Page, Sitemap. The content pages represent the major part of a web site and need further attention by identifying topics of the content pages and the topic transition per click in order to quantify successful transitions. Due to the fact that the last click cannot be evaluated, a value of 0 is assigned to all click sequences page-to-end.

Generally, page categories may be determined by a web author manually or by the Hits-algorithm (von Kleinberg) both assigning category values to a web page reflecting its function to deliver content or allowing navigation. This increases flexibility of the on hand method.

In another aspect of the present invention, effectiveness of transition is measured based on web page topics of content pages, and transitions between such topics are evaluated for quantifying successful guidance of the user. Having assigned values to each page category transition, the transitions between content pages are evaluated in greater detail. Transitions which stay within a topic are emphasized, whereas transitions between topic areas are de-emphasized, thereby capturing in the metric the type of transition occurring between web pages bearing content. The distance between all possible content page transitions is calculated based on the comparison of both topics. In other words a similarity measure by comparing the topic affiliation of all pages is established.

A degree of topic change may be performed by regarding all occurring topic transitions of a currently evaluated user session and comparing them with the topic transitions in focus. Thus, topic changes are normalized and become better comparable to each other regarding transition distance.

For identifying topics of a web site, keywords may be extracted from the visited web pages and clustered to identify content groups building topics, a probability is calculated for each page of belonging to a topic, resulting in a topic vector for each web page, and a distance is calculated between all web pages based on content similarity. Since only few pages are designed for the Semantic Web, this method is most promising for establishing accurate results.

Clustering techniques like hierarchical clustering, k-means clustering or probabilistic latent semantic indexing by maximization of likelihood by EM-algorithm may be performed, the quality of their results has already been evaluated in detail (Stolz C.; Gedov V.; Yu K.; Neuneier R. and Skubacz M. Measuring semantic relations of web sites by clustering of local context. In Springer LNCS: Proc. of 4th International Conference on Web Engineering, ICWE 2004, Munich, Germany, pages 182-186. Springer, 2004 and Stolz C.; Viermetz M.; Skubacz M. and Neuneier R. Improving semantic consistency of web sites by quantifying user intent. Springer LNCS: Proc. of 5th Int. Conference on Web Engineering, ICWE 2005, Sydney, Australia, 2005).

In order to increase effectivity of the method, the extracted keywords may be cleaned from single occurring words, stop words and stems. In general the resulting keyword vector for each web page is proportional to text length. Keywords that occur only on one web page cannot contribute to web page similarity and can therefore be excluded. This helps to reduce dimensionality. To further reduce noise in the data set additional processing may be necessary, in particular applying a stop word list, which removes given names, months, fill words and other non-essential text elements. Afterwards words may be reduced to their stems with eg Porter's stemming method.

The user behavior depends on his interest. Some users are interested in one topic, others want to have an overview over the whole web site. Therefore, a user type may be considered by comparing each topic transition with a topic mixture of the user session, a resulting vector measuring a degree of change in content allowing an estimate of the content the user is interested in. The resulting matrix measures the degree of change in content allowing an estimate of the content the user is interested in.

A preferred scoring model includes assigning high values to transitions from navigation to content web pages and low values vice versa. That is, the user is given bonus points (eg positive values) for reaching a content page, which indicates successful guidance. On the other hand the user is given penalty points (eg negative values) when returning to a navigation page, which indicates failure in guidance of the user. Such scoring model is easy to apply and to implement.

In a still further aspect of the present invention, efficiency of transition is measured based on a duration, ie a time the user stays on a web page, the text length of such web page and/or a web page category. Table 2 assigns eg positive bonus values to long durations on content pages and negative penalty values to navigation pages and vice versa for short durations.

TABLE 2 i. Web Page Duration Rating

|  | Short duration | Long duration |
| --- | --- | --- |
| Navigation | + | − |
| Content | − | + |

However, the duration depends not only on the user, but also on the text length, ie the amount of information, and the web page category, since different categories have different desired duration times for the user to stay on the specific web page. Under consideration of text length and web page category, thus an accurate evaluation of guidance success is introduced to the metric.

As to limitations, the duration of the last click in a user session is not measurable since we do not receive any further user actions after the last click. The time between the user's actions can be measured, which means the time between the clicks, but it is technically not possible to measure either the amount of attention the user paid to the web page content or whether he read the content at all. It is generally only possible to achieve this with any accuracy under controlled conditions. In case of tabbed browsing, allowed by a newer generation of browsers, the duration and sequence does not necessarily resemble the sequence and duration the user is reading the content.

Considering the user's duration of stay on a web page the scope of transitions may further be extended. Since the transition from navigation to content pages is considered to be crucial for a web pages success, focus is now laid on these transitions. So far each click or page sequence on its own has been evaluated. The success of a sequence navigation-to-content can more accurately be judged by taking the next click into account. Extending the transition from two to three pages allows an evaluation of user feedback to the interestingness and relevance of the offered content of the first evaluated click from the navigation page to the content page.

The second degree scoring model described so far may therefore be even extended to a third degree model, if the duration the user stays on subsequent web pages following a navigation-to-content transition is considered. The second degree model assigns eg positive values to the navigation-to-content transition. But it is not considered whether the user was guided to the desired content. Hence the user feedback has to be considered. It can be estimated by analyzing the duration how long the user looked at the offered content in combination with the subsequent page type.

For making the durations better comparable to each other, the duration an average user is expected to stay on a web page may be calculated by taking all durations and the text length into consideration allowing a comparison of the individual duration of a single user compared with the average time of all users.

In addition, a preferred scoring model includes assigning high values to long duration on content pages and low values to long durations on navigation pages and vice versa. That is, the user is given bonus points (eg positive values) for a long stay on a content page, which indicates successful guidance. On the other hand the user is given penalty points (eg negative values) when returning to a navigation page, which indicates failure in guidance of the user. Such scoring model is easy to apply and to implement.

For reflecting how well a web site guides a user to the content he or she seeks, the metric includes multiplication of the transition values per click and forming the total of such products over user sessions for determining the indicator value. This calculation is easy to apply and to implement. The indicator value is referred to as the Guidance Performance Indicator.

For summarizing the above, a metric is introduced to measure the success of an information driven web site in meeting its objective to deliver the desired information in a timely and usable fashion. It is proposed to assign a value to each click based on the type of transition, duration and semantic distance. These values are then combined into a scoring model describing the success of a web site in meeting its objectives. The resulting metric is introduced as the GPI (Guidance Performance Indicator) and its applicability will be shown on a large corporate web site.

In more detail, first it has to be found out when a user may be judged to have found what he or she was looking for. The objective of these sites is to guide the user to the desired content pages. Navigation pages support the user in his search.

Transition between navigation and content pages as well as within both page categories is analyzed. The objective of information driven web sites is defined so as to lead the user to content pages as fast as possible and hold her there as long as possible. Therefore the time that the user has stayed on a web page is used as a factor in the metric. The web page topic is also considered in order to incorporate user interest into the metric.

The method combines transitions between page types, duration and topic mixture in order to evaluate the positive or negative contribution to the objective of a web site. On his or her way through the web site the user collects high and low scores. Beyond the transition described by a single click the analysis is extended to a transition composed of several consecutive clicks. This increase in scope will give the scoring model additional accuracy. The approach to generating the metric can be considered generic and is applicable to all kinds of web sites focused on providing information.

Existing web metrics are unable to accurately measure the success of information driven web sites, since they focus on transaction based web sites. In this approach this limitation is addressed. Combining the available structure, content and usage data of a web site, a scoring model is developed and its applications are described. By extending the model from click sequences of two to more clicks, an extended model is created that allows better interpretation and application. In a case study we use real world data gained from a corporate web site for evaluation.

A computer program product is directly loadable into the internal memory of a digital computer and comprises software code portions for performing the method when said product is run on a computer.

The computer program product can be stored on a computer usable medium.

BRIEF DESCRIPTION OF THE DRAWINGS

Present invention will be described in more detail by means of an example referring to the related figures, whereby.

DETAILED DESCRIPTION OF INVENTION

Figure 1:
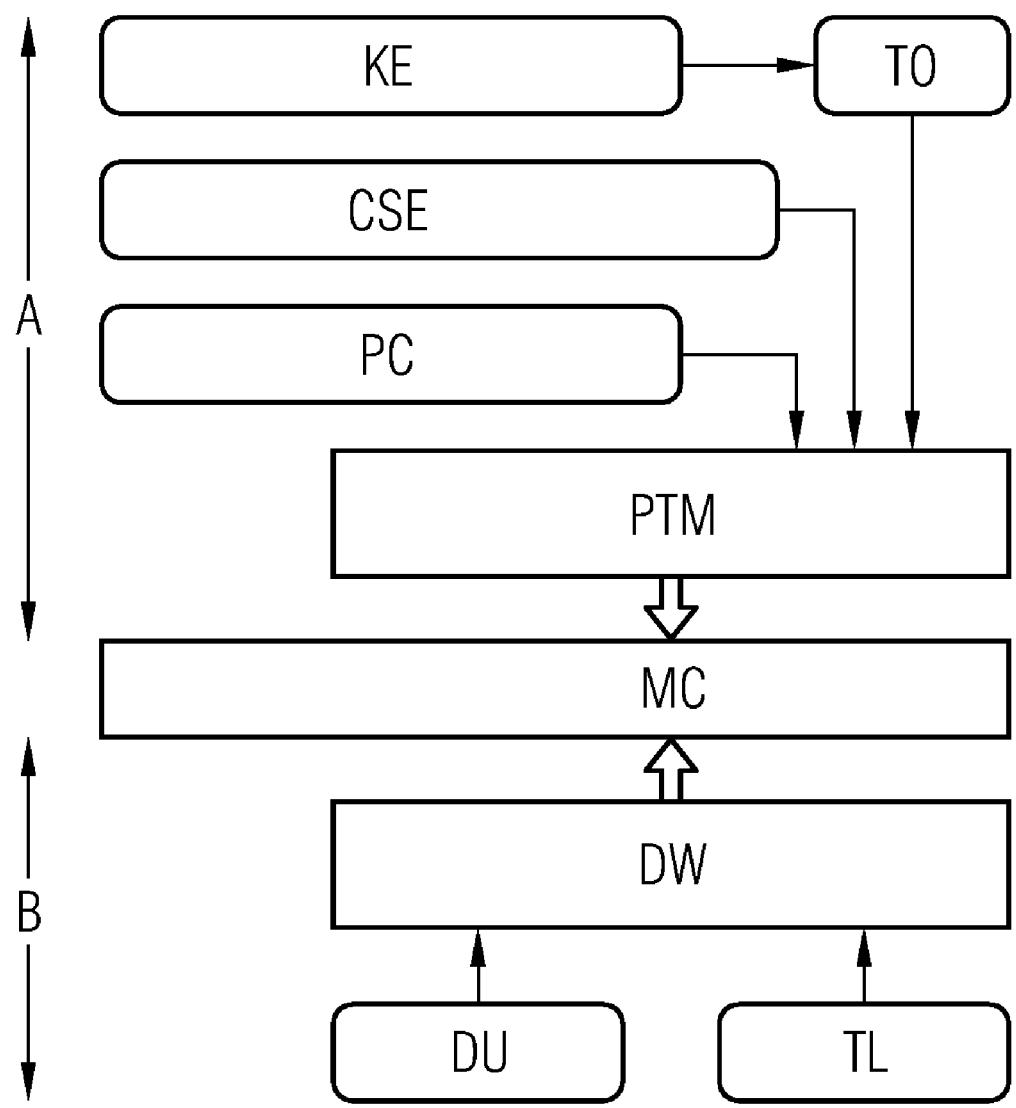
FIG. 1 shows a metric building process.

FIG. 1 shows a metric building process according to an example of the inventive method. For calculation of effectiveness measures A (Effectiveness Measure) the textual information from the web pages is first extracted with the help of a crawler from KE (Keyword Extraction). After cleaning the data the number of topic clusters is determined from TO (TOpics) and standard clustering methods are applied to identify groups of related web pages.

Now all the information needed is available to construct the transition matrix in step PTM (Page Transition Matrix) assigning values to each possible click. The basic value for each click from CSE (Click Sequence Extraction) is derived from the categories of the source and destination pages from PC (Page Categories), as already described in table 1. The multiplication factors are directly derived from the transition table.

As to the definition of a transition type, let $\tau$ be a transition within the web site and T the associated transition table. The transition type $\chi_\tau$ is defined as $$\chi_\tau = 1 * \text{sign}(T_{i,j}) \quad (1)$$

where i is the source type of $\tau$, and j the destination page type.

The next aspect captured in the metric is the type of transitions occurring between web pages bearing content. We want to emphasize transitions which stay within a topic, and de-emphasize transitions between topic areas as already set out before.

For normalization purposes, instead of using continuous values as gained from the distance between individual pages, a transition is determined to be significant or not. A significant transition distance would signify a change in topic, while an insignificant shift would leave the user perusing the same general topic area. Since a web site is meant to guide a user quickly to the content he desires, a characterization of this topic change is introduced.

What concerns the definition of a transition weight, let $\tau$ be a transition between content pages. The effectiveness of a transition is captured by an assigned weight factor $\mu_\tau$.

$$\mu_\tau = \begin{cases} \text{negligible topic shift} & \Rightarrow 1 < \mu_\tau \\ \text{significant topic shift} & \Rightarrow 0 < \mu_\tau < 1 \end{cases} \quad (2)$$

The evaluation of the degree of topic change is performed by regarding all occurring topic transitions and comparing them with the topic transition in focus, as can best be seen in FIG. 3, which will be explained later on. Any change larger than x is considered significant, while any change smaller would leave the user within the same general topic.

The necessary information for the efficiency measures in B (Efficiency Measure), specifically duration DU (DUration) and text length TL (Text Length), have been collected along with the other data. The time necessary to perceive, read and understand textual information depends apart from design issues mainly on the length of the text. The interest of a user in a given content page is characterized by calculating the time spent per word. By contrasting this value to the average time spent on all words for all users, a feeling is established for where a user's focus is acknowledged, and where not.

As to the efficiency factor DW (Duration Weight), let $\tau$ be a transition within the web site. The duration $d_\tau$ and the text length $l_\tau$ of the source page is also known. With this, the global average of all users reading a word $\delta_{word}$ is also maintained by:

$$\delta_{word} = \frac{\sum_{\forall \tau} d_\tau}{\sum_{\forall \tau} l_\tau} \quad (3)$$

The efficiency $\Phi$ of a transition $\tau$ can now be characterized with respect to $\delta_{word}$ for:

$$\text{content} \xrightarrow{\tau} \text{content} \quad (4)$$

$$\phi_\tau = \begin{cases} 0 < x < 1 & \delta_{word} > \delta_{word}^\tau \\ 1 < x & \delta_{word} < \delta_{word}^\tau \end{cases}$$

and $$f \text{ navigation} \xrightarrow{\tau} \text{content}$$

$$\phi_\tau = \begin{cases} 0 < x << 1, & \text{if } \delta_{word} < \delta_{word}^\tau \\ 1 << x, & \text{if } \delta_{word} > \delta_{word}^\tau \end{cases} \quad (5)$$

With the help of the defined characteristics, the metric may now be constructed. Since the metric reflects how well a web site guides a user to the content he seeks, the metric is referred to as the Guidance Performance Indicator GPI.

Such indicator determines the effectiveness of a session $\sigma$ with $\sigma = \{\tau_1, \tau_2, \ldots \tau_m\}$ by combining the transition type $\chi_\tau$, transition weight $\mu_\tau$ and transition efficiency $\Phi_\tau$ for each transition $\tau \in \sigma$.

$$GPI_\sigma = \sum_{i=1, \tau_i \in \sigma}^{|\sigma|} \chi_{\tau_i} * \mu_{\tau_i} * \phi_{\tau_i} \quad (6)$$

Figure 2:
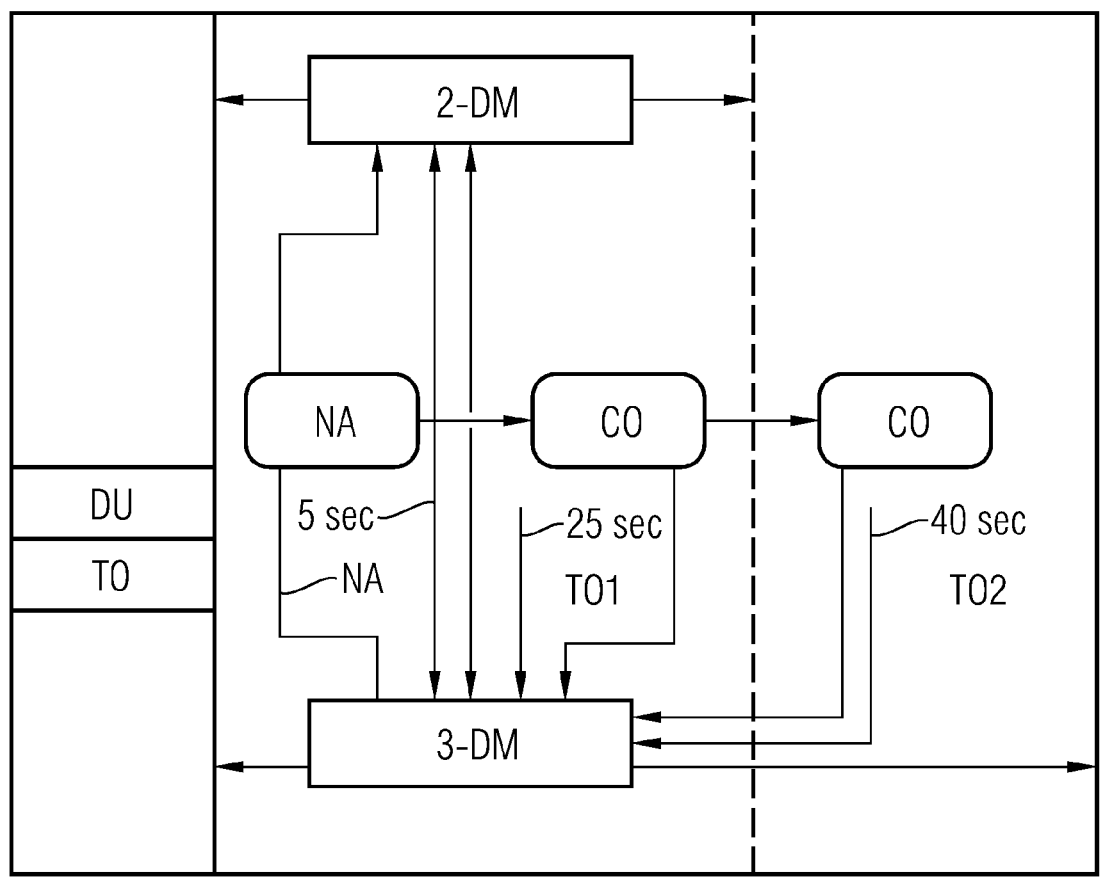
FIG. 2 shows a combined second and third degree model for constructing the metric.

FIG. 2 shows a combined second and third degree model for constructing the metric according to an example of the inventive method. The example shows the difference between the second degree and the third degree model 2-DM, 3-DM. The user has reached a content page CO via the search page NA (DU=5 sec). Now he stays long (DU=25 sec) and proceeds to another content page CO. This is considered positive, since the user has been led to a content page CO and kept there for a longer time (DU=40 sec), allowing the estimation that he was interested in the content.

A change in this scenario leads to a different judgment about the web sites success. If the user returned from the content page CO after a short time to the search page NA, the offered content page CO did not show any desired information TO1.

The third degree model includes information of the user action (click) following the evaluated click. First the duration on the content page CO where the user has been led to and second the following page type. The revised scoring model regards the following scenarios:

positive: navigation-to-content (normal duration)-to-subsequent pages . . .

negative: navigation-to-content (short duration)-to-subsequent pages . . .

If the user was actually interested in the content TO2, he or she will respectively stay longer (DU=40 sec). The user will leave the page CO and the duration will be short.

So far the third degree model allows to integrate user feedback on one specific scenario. A general consideration of transitions over more pages should make the model more accurate.

Figure 3:
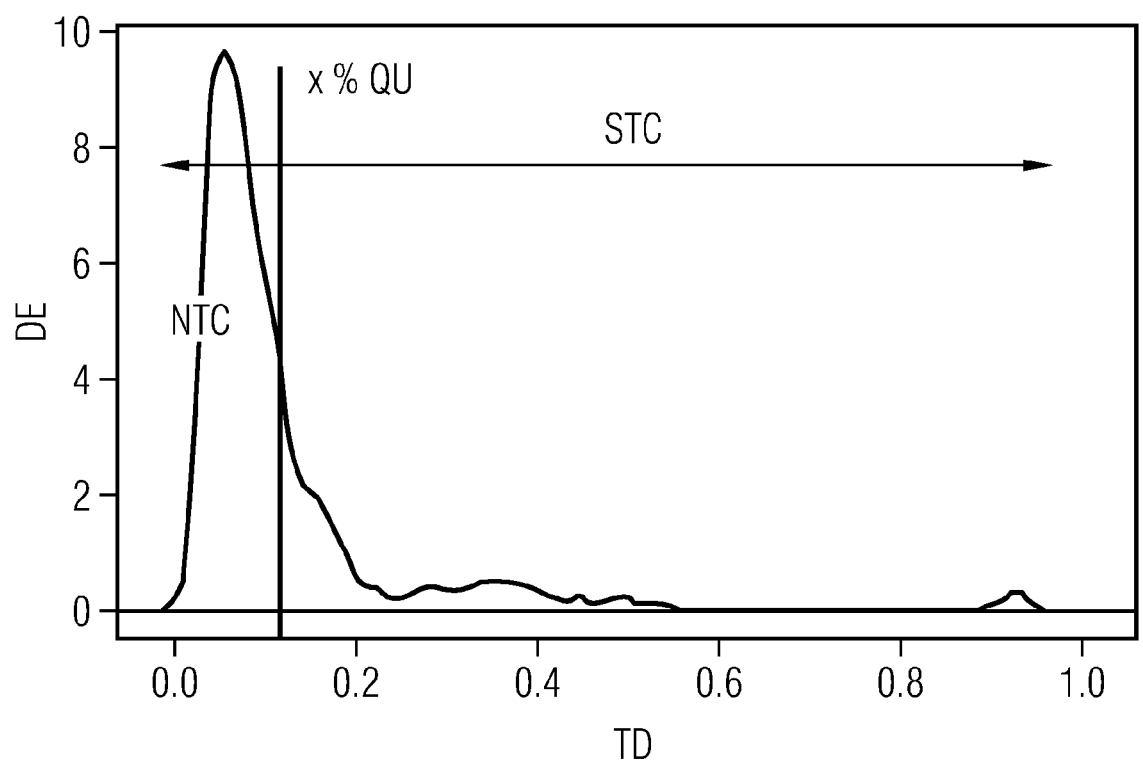
FIG. 3 shows a weight determination of topic changes.

FIG. 3 shows a weight determination of topic changes applied in an example of the inventive method (N=61009, 247 content pages). The graph represents a density DE of topic shift over transition distances TD. The evaluation of the degree of topic change is performed by regarding all occurring topic transitions and comparing them with the topic transition in focus. Any change larger than x % QU (Quantile) is considered significant, while any change smaller would leave the user within the same general topic.

For evaluation usage data from a corporate web site dealing with financial products and services over a time period of one month have been analyzed, consisting of 247 content pages and 8 navigation pages with 10290 page impressions or clicks and 4301 sessions. 10 topics have been identified.

As to web page assessment, one application of the GPI is to evaluate and compare web pages. Two navigation pages and one content page as comparison have been regarded, since one GPI value of its own reveals no user feedback. Both navigation pages are search pages, namely the simple search and the advanced search offering more selection possibilities.

Table 3 shows the absolute GPI values. In order to compare the GPI values of pages with different traffic density, we contrast their average GPIs per click.

TABLE 3 i. GPI applied to example pages

|  | GPI | Clicks | GPI/clicks |
| --- | --- | --- | --- |
| Simple Search | −350.5 | 443 | −0.79 |
| Advanced Search | 14.9 | 75 | 0.20 |
| Products: Leasing | 775.5 | 1193 | 0.65 |

The negative average GPI per click for the simple search page can have from several reasons. Users need more time to find a relevant search result within all search results or the search leads to information not of interest to the user. Whereas the Advanced Search reached a positive GPI by leading users faster to desired information. This is a reasonable result, since more selection criteria allow better search results. But 443 times the simple search was used compared to 75 times usage of advanced search.

By making the advanced search more prominent on the web page, the development of the GPI over time would give valuable hints to the effectiveness of this design decision.

Regarding session assessment, table 4 shows two sample sessions. Both users have each accessed a search page and have been directed to a content page. According to the GPI the web site provided better guidance in the first instance, session It took the second user (who was accessing the simple search page) two clicks to reach a content page, which he or she left after a short duration and retreated to the home page. The negative GPI reflects the assumption that this user did not find what he was looking for.

TABLE 4 i. Example Sessions evaluated by GPI

|  | $GPI_1$ | $GPI_2$ | $GPI_3$ | Total |
| --- | --- | --- | --- | --- |
| Basic Model GPI | | | | |
| Home → Advanced Search → Content → Content | −1.1 | 1.7 | 1.5 | 2.1 |
| Search → Search → Content → Home | −1.2 | 1.44 | −1.4 | −1.16 |
| Extended Model GPI | | | | |
| Home → Advanced Search → Content → Content | −1.1 | 1.7 | 1.5 | 2.1 |
| Search → Search → Content → Home | −1.2 | −1.44 | −1.4 | −4.04 |

What concerns the extended scoring model, comparing the basic model with the extended model in table shows in table 4 that the first session is not measured differently. The extended model assigned a much lower GPI to the second click in the session (search-to-content), because the user did not stay long on the content page. The extended model penalizes the misleading search results.

From 882 possible transitions falling into the category navigation-to-content to- . . . 164 transition weights or 18% have been recognized as misleading by the extended scoring model. The average click value of 0.66 was slightly reduced to 0.65.

In order to evaluate this extended model, a longer evaluation period is necessary as well as an empirical user enquiry.

As for a conclusion, it is stated that although there are numerous general metrics to measure web site usability and success available today, those including user feedback are limited to analyzing transaction based e-commerce web sites.

Therefore it is introduced a new metric geared towards assessing the success of information driven web sites. By modeling desired user behavior patterns, the metric assigns positive as well as negative values according to the perceived success of a user session. The challenge is approached by making user feedback available without enquiring the user directly, by analyzing his or her behavior and visited content.

With help of the GPI metric a web site editor can discover important elements in the website structure and content, which influence user behavior. For example attractive content presentation, positive web site design or misleading navigation. Monitoring the development of the metric over time can reveal user acceptance of the web site and reactions to changes in content and design.

The GPI can be applied to all kind of web sites without and can be adjusted to specific web site characteristics by fine-tuning of the transition matrix.

This approach can be further generalized to almost arbitrary flows of sequential and parallel occurring events for example within a workflow of processes, in particular for processes for which no direct feedback can be measured.

According to an embodiment of the invention, the method is implemented as a computer program.

The invention claimed is:
1. A method of computer-based detecting of guidance performance of an information driven web site for a user seeking a desired content, comprising:
assigning a transition value to each click based on an effectiveness and efficiency of transition between web pages of the web site; and determining an indicator value by combining the transition values into a metric that reflects guidance performance of the web site;

wherein the effectiveness of transition is measured based on web page categories that comprise navigation and content pages and transitions between the web page categories are evaluated for qualifying successful guidance of the user;

wherein web page categories are determined by a web author manually or via a Hits-algorithm both assigning category values to a web page reflecting web page functionality for delivering content and allowing navigation;

wherein effectiveness of transition is measured based on web page topics of content pages and transitions between the web page topics are evaluated for quantifying successful guidance of the user;

wherein a degree of topic change is performed by regarding all occurring topic transitions of a currently evaluated user session and comparing them with topic transitions in focus;

wherein keywords are extracted from visited web pages and clustered to identify content group building topics, a probability is calculated for each web page belonging to a content group building topic, resulting in a content group building topic vector for each web page, and a distance is calculated between all web pages based on content similarity; and wherein hierarchical clustering, k-means clustering or probabilistic latent semantic indexing by maximization of likelihood by EM-algorithm is performed.

2. The method according to claim 1, wherein extracted keywords are cleaned from single occurring words, stop words and stems.

3. The method according to claim 2, wherein a user type is considered by comparing each topic transition with a topic mixture of a user session, a resulting vector measuring a degree of change in content allowing an estimate of content the user is interested in.

4. The method according to claim 3, wherein high values are assigned to transitions from navigation to content web pages and low values are assigned vice versa.

5. The method according to claim 4, wherein efficiency of transition is measured based on a duration the user stays on a web page, text length of that web page and/or a web page category.

6. The method according of claim 5, wherein a duration the user stays on subsequent web pages following a navigation-to-content transition is considered.

7. The method according to claim 6, wherein a duration an average user is expected to stay on a web page is calculated by taking all durations and web page text length into consideration allowing a comparison of an individual duration of a single user compared with an average time of all users.

8. The method according to claim 7, wherein high values are assigned to long duration on content pages and low values are assigned to long durations on navigation pages and vice versa.

9. The method according to claim 8, wherein the metric includes multiplication of transition values per click and forming the total of such products over user sessions for determining the indicator value.

10. A non-transitory computer useable medium that stores a computer program product that is comprised of instructions, when the instructions are executed by a computer device, the computer device performs steps comprising:

assigning a transition value to each click based on an effectiveness and efficiency of transition between web pages of the web site; and determining an indicator value by combining the transition values into a metric that reflects guidance performance of the web site;

wherein the effectiveness of transition is measured based on web page categories that comprise navigation and content pages and transitions between the web page categories are evaluated for qualifying successful guidance of the user;

wherein web page categories are determined by a web author manually or via a Hits-algorithm both assigning category values to a web page reflecting web page functionality for delivering content and allowing navigation;

wherein effectiveness of transition is measured based on web page topics of content pages and transitions between the web page topics are evaluated for quantifying successful guidance of the user;

wherein a degree of topic change is performed by regarding all occurring topic transitions of a currently evaluated user session and comparing them with topic transitions in focus;

wherein keywords are extracted from visited web pages and clustered to identify content group building topics, a probability is calculated for each web page belonging to a content group building topic, resulting in a content group building topic vector for each web page, and a distance is calculated between all web pages based on content similarity; and wherein hierarchical clustering, k-means clustering or probabilistic latent semantic indexing by maximization of likelihood by EM-algorithm is performed.

11. A computer device having internal non-transitory memory that has instructions stored thereon, when the instructions are executed by the computer device the computer device performs steps comprising:

assigning a transition value to each click based on an effectiveness and efficiency of transition between web pages of the web site; and determining an indicator value by combining the transition values into a metric that reflects guidance performance of the web site;

wherein the effectiveness of transition is measured based on web page categories that comprise navigation and content pages and transitions between the web page categories are evaluated for qualifying successful guidance of the user;

wherein web page categories are determined by a web author manually or via a Hits-algorithm both assigning category values to a web page reflecting web page functionality for delivering content and allowing navigation;

wherein effectiveness of transition is measured based on web page topics of content pages and transitions between the web page topics are evaluated for quantifying successful guidance of the user;

wherein a degree of topic change is performed by regarding all occurring topic transitions of a currently evaluated user session and comparing them with topic transitions in focus;

wherein keywords are extracted from visited web pages and clustered to identify content group building topics, a probability is calculated for each web page belonging to a content group building topic, resulting in a content group building topic vector for each web page, and a distance is calculated between all web pages based on content similarity; and wherein hierarchical clustering, k-means clustering or probabilistic latent semantic indexing by maximization of likelihood by EM-algorithm is performed.

* * * * *